(12) United States Patent
Kim

(10) Patent No.: US 12,308,660 B2
(45) Date of Patent: May 20, 2025

(54) WIRELESS POWER RECEIVER, AND METHOD PERFORMED BY WIRELESS POWER RECEIVER

(71) Applicant: Samsung Electronics Co., Ltd., Suwon-si (KR)

(72) Inventor: Yusu Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/521,268

(22) Filed: Nov. 28, 2023

(65) Prior Publication Data
US 2024/0097495 A1 Mar. 21, 2024

Related U.S. Application Data

(63) Continuation of application No. PCT/KR2022/004788, filed on Apr. 4, 2022.

(51) Int. Cl.
*H02J 50/12* (2016.01)
*H01F 38/14* (2006.01)
(Continued)

(52) U.S. Cl.
CPC .............. *H02J 50/12* (2016.02); *H01F 38/14* (2013.01); *H02J 50/402* (2020.01); *H02M 7/219* (2013.01); *H04B 5/79* (2024.01)

(58) Field of Classification Search
CPC .......... H02J 50/12; H02J 50/402; H02J 50/10; H02J 50/40; H02J 50/80; H01F 38/14; H02M 7/219; H04B 5/79
See application file for complete search history.

(56) References Cited

U.S. PATENT DOCUMENTS

| 10,320,239 B2 * | 6/2019 | Hwang | H02J 50/12 |
| 2013/0031379 A1 * | 1/2013 | Wacker | H04Q 11/0067 713/300 |

(Continued)

FOREIGN PATENT DOCUMENTS

| JP | 2021019449 A | 2/2021 |
| KR | 20130031379 A | 3/2013 |

(Continued)

OTHER PUBLICATIONS

International Search Report for PCT/KR2022/004788 mailed Jul. 14, 2022, 4 pages.

(Continued)

*Primary Examiner* — Jared Fureman
*Assistant Examiner* — Michael J Warmflash
(74) *Attorney, Agent, or Firm* — Nixon & Vanderhye, P.C.

(57) ABSTRACT

A wireless power receiver configured to receive wireless power from a wireless power transmitter comprises: a first coil configured to receive wireless power transmitted inductively; a second coil and a third coil configured to receive wireless power transmitted resonantly; a receiver integrated circuit (RXIC) comprising a full bridge structure, and including a first rectifier circuit including a first FET, a second FET, a third FET, and a fourth FET; and a second rectifier circuit, wherein an output terminal of the second rectifier circuit is connected to an output terminal of the first rectifier circuit, sources of the first FET and the second FET are connected to a ground, and, based on the first FET and the second FET being switched to an on-state and the third FET and the fourth FET being switched to an off-state, based on the wireless power transmitter inductively transmitting the wireless power, the wireless power receiver is configured to receive the wireless power through the first coil, and (Continued)

convert the received wireless power to DC power by body diodes of the third FET and the fourth FET to receive power for booting the RXIC, and, based on the wireless power transmitter resonantly transmitting the wireless power, the wireless power receiver is configured to receive the wireless power by inducing current in the third coil based on a magnetic field generated in the second coil, and rectify the received wireless power by the second rectifier circuit to receive power for booting the RXIC.

20 Claims, 8 Drawing Sheets

(51) Int. Cl.
*H02J 50/40* (2016.01)
*H02M 7/219* (2006.01)
*H04B 5/79* (2024.01)

(56) References Cited

U.S. PATENT DOCUMENTS

| | | | | |
|---|---|---|---|---|
| 2013/0119776 | A1* | 5/2013 | Kamata | H02J 50/80 307/104 |
| 2015/0115878 | A1* | 4/2015 | Park | H02J 50/40 320/108 |
| 2015/0138065 | A1* | 5/2015 | Alfieri | G02B 27/017 345/156 |
| 2015/0349573 | A1* | 12/2015 | Tschirhart | H02J 50/12 320/108 |
| 2016/0070709 | A1* | 3/2016 | Luan | G06Q 30/0282 707/728 |
| 2016/0119530 | A1* | 4/2016 | Chen | G06F 3/00 348/211.6 |
| 2016/0172869 | A1* | 6/2016 | Park | H02J 50/12 307/104 |
| 2016/0261134 | A1* | 9/2016 | Wu | H02J 50/12 |
| 2017/0025897 | A1* | 1/2017 | Menegoli | H02M 7/48 |
| 2018/0124274 | A1* | 5/2018 | Terashita | H04N 1/3278 |
| 2018/0138749 | A1* | 5/2018 | Lee | H02J 50/12 |
| 2021/0075270 | A1* | 3/2021 | Choi | H02J 50/402 |
| 2022/0068114 | A1* | 3/2022 | Baldwin | B60Q 1/52 |

FOREIGN PATENT DOCUMENTS

| | | |
|---|---|---|
| KR | 20140141011 A | 12/2014 |
| KR | 20150050027 A | 5/2015 |
| KR | 20150138065 A | 12/2015 |
| KR | 20160070709 A | 6/2016 |
| KR | 20160119530 A | 10/2016 |
| KR | 20180124274 A | 11/2018 |
| KR | 101944387 B1 | 4/2019 |
| KR | 20210030131 A | 3/2021 |
| KR | 20220068114 A | 5/2022 |
| WO | 2016093650 A1 | 6/2016 |
| WO | 2019022400 A1 | 1/2019 |

OTHER PUBLICATIONS

Written Opinion of the ISA for PCT/KR2022/004788 mailed Jul. 14, 2022, 5 pages.

* cited by examiner

WIRELESS POWER RECEIVER, AND METHOD PERFORMED BY WIRELESS POWER RECEIVER

CROSS-REFERENCE TO RELATED APPLICATIONS

This application is a continuation of International Application No. PCT/KR2022/004788 designating the United States, filed on Apr. 4, 2022, in the Korean Intellectual Property Receiving Office and claiming priority to Korean Patent Application No. 10-2021-0071779, filed on Jun. 2, 2021, in the Korean Intellectual Property Office, the disclosures of each of which are incorporated by reference herein in their entireties.

BACKGROUND

Field

The disclosure relates to a wireless power receiver and a method performed by the wireless power receiver.

Description of Related Art

Recently, wireless charging technology using electromagnetic induction or magnetic resonance has been popularized mainly for electronic devices such as smartphones. When a wireless power transmitting unit (PTU) (e.g., a wireless charging pad) and a power receiving unit (PRU) (e.g., a smartphone) come into contact or approach within a certain distance, the battery of the PRU may be charged by electromagnetic induction or electromagnetic resonance between the transmission coil of the PTU and the reception coil of the PRU.

FIG. 1 is a circuit diagram illustrating a wireless power receiver for performing wireless charging according to a comparative example. Referring to FIG. 1, a wireless power receiver 101 may include a resonant circuit 110, a rectification circuit 130, a capacitor 140, and a load 150, and the resonant circuit may include a first coil 111, a first capacitor 112, a second coil 118, a third coil 119, a second capacitor 121, a third capacitor 122, a first metal oxide semiconductor field effect transistor (MOSFET) 115, a second MOSFET 116, a third MOSFET 113, a fourth MOSFET 114, and a drive circuit 117.

FIG. 2A illustrates an equivalent circuit of the wireless power receiver 101 according to the comparative example, when the drive circuit 117 synchronously controls the first MOSFET 115, the second MOSFET 116, the third MOSFET 113, and the fourth MOSFET 114. Referring to FIG. 2A, when the drive circuit 117 synchronously controls the first MOSFET 115, the second MOSFET 116, the third MOSFET 113, and the fourth MOSFET 114, current may be induced in a first circuit 210a including the first coil 111 and the first capacitor 112 based on a magnetic field generated from a wireless power transmitter, the induced current may be rectified by the first MOSFET 115, the second MOSFET 116, the third MOSFET 113, and the fourth MOSFET 114, and rectified power may be supplied to an output terminal of the rectification circuit 130 and thus to the capacitor 140 and the load 150.

FIG. 2B illustrates an equivalent circuit of the wireless power receiver 101 according to the comparative example, when the drive circuit 117 controls the third MOSFET 113 and the fourth MOSFET 114 to an on state and the first MOSFET 115 and the second MOSFET 116 to an off state. Referring to FIG. 2B, because current flows in the third MOSFET 113 and the fourth MOSFET 114 controlled to the on state, the resonant circuit may include a second circuit 210b forming a closed loop of the first coil 111, the first capacitor 112, the third MOSFET 113, and the fourth MOSFET 114, and a third circuit 220b including the third MOSFET 113, the fourth MOSFET 114, the second coil 118, the third coil 119, the second capacitor 121, and the third capacitor 122. In other words, the resonant circuit may receive wireless power from the wireless power transmitter, as current is induced in the second circuit 210b based on a magnetic field generated by the wireless power transmitter and current is induced in the third circuit 220b based on a magnetic field generated by the first coil 111. The received wireless power may be rectified by the rectification circuit 130, and the rectified wireless power may be supplied to the capacitor 140 and the load 150.

The wireless power receiver 101 according to the comparative example, described above with reference to FIGS. 1, 2A, and 2B, may be used in an electronic device that receives wireless power in a resonant scheme. The wireless power receiver 101 according to the comparative example may initially control the third MOSFET 113 and the fourth MOSFET 114 to the on state and the first MOSFET 115 and the second MOSFET 116 to the off state as illustrated in FIG. 2B, in order to sufficiently increase the output voltage of the rectification circuit.

However, it is difficult to determine an operation scheme for the wireless power receiver 101 according to the comparative example that supports both wireless power reception in the inductive scheme and wireless power reception in the resonant scheme. When initially the third MOSFET 113 and the fourth MOSFET 114 are controlled to the on state and the first MOSFET 115 and the second MOSFET 116 are controlled to the off state as illustrated in FIG. 2B, wireless power reception and rectification in the resonance scheme is possible. However, when wireless power reception is performed in the induction scheme, received power may not be rectified.

SUMMARY

Embodiments of the disclosure provide a wireless power receiver that may identify a frequency of wireless power after booting a receiver integrated circuit (RXIC) and determine an operation scheme based on the frequency of the wireless power.

According to various example embodiments, a wireless power receiver for receiving wireless power from a wireless power transmitter includes: a first coil configured to receive wireless power transmitted in an inductive scheme, a second coil and a third coil configured to receive wireless power transmitted in a resonant scheme, a receiver integrated circuit (RXIC) including a first rectification circuit comprising a full bridge structure and including a first field effect transistor (FET), a second FET, a third FET, and a fourth FET, and a second rectification circuit, wherein an output terminal of the second rectification circuit is connected to an output terminal of the first rectification circuit. Sources of the first FET and the second FET are connected to a ground. Based on the first FET and the second FET being switched to an on state, and the third FET and the fourth FET being switched to an off state: based on the wireless power transmitter transmitting the wireless power in the inductive scheme, the wireless power receiver is configured to receive power for booting the RXIC by receiving the wireless power through the first coil and converting the received wireless power into direct current (DC) power by body diodes of the third FET and the fourth FET, and based on the wireless power transmitter transmitting the wireless power in the resonant scheme, the wireless power receiver is configured to receive the power for booting the RXIC by receiving the wireless power by induction of current in the third coil based on a magnetic field generated in the second coil and rectifying the received wireless power by the second rectification circuit.

According to various example embodiments, a method performed by a wireless power receiver for receiving wireless power from a wireless power transmitter includes: detecting that a voltage is applied to an input terminal of a receiver integrated circuit (RXIC) including a first rectification circuit comprising a full bridge structure and including a first FET, a second FET, a third FET, and a fourth FET, receiving the wireless power for booting the RXIC, and booting the RXIC. Receiving the wireless power for booting the RXIC includes based on the first FET and the second FET being switched to an on state, and the third FET and the fourth FET being switched to an off state: based on the wireless power transmitter transmitting the wireless power in an inductive scheme, receiving the wireless power through a first coil receiving wireless power in the inductive scheme and converting the received wireless power into DC power by body diodes of the third FET and the fourth FET; or based on the wireless power transmitter transmitting the wireless power in a resonant scheme, receiving the wireless power by induction of current in a third coil based on a magnetic field generated in a second coil, and rectifying the received wireless power by a second rectification circuit.

According to various example embodiments, a wireless power receiver and a method performed by the wireless power receiver are provided. When the wireless power receiver according to various embodiments includes a receiver integrated circuit (RXIC) including a first rectification circuit with four FETs, two of the four FETs are switched to an on state, and the remaining two FETs are switched to an off state, the wireless power receiver may receive power for booting the RXIC in both a case in which a wireless power transmitter transmits wireless power in an inductive scheme and a case in which a wireless power transmitter transmits wireless power in a resonant scheme.

After receiving the power for booting the RXIC, the wireless power receiver according to various example embodiments may determine an operation scheme based on the frequency of the wireless power. Accordingly, the wireless power receiver according to various example embodiments may provide a method of operating a wireless power receiver that supports both the inductive scheme and the resonant scheme.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
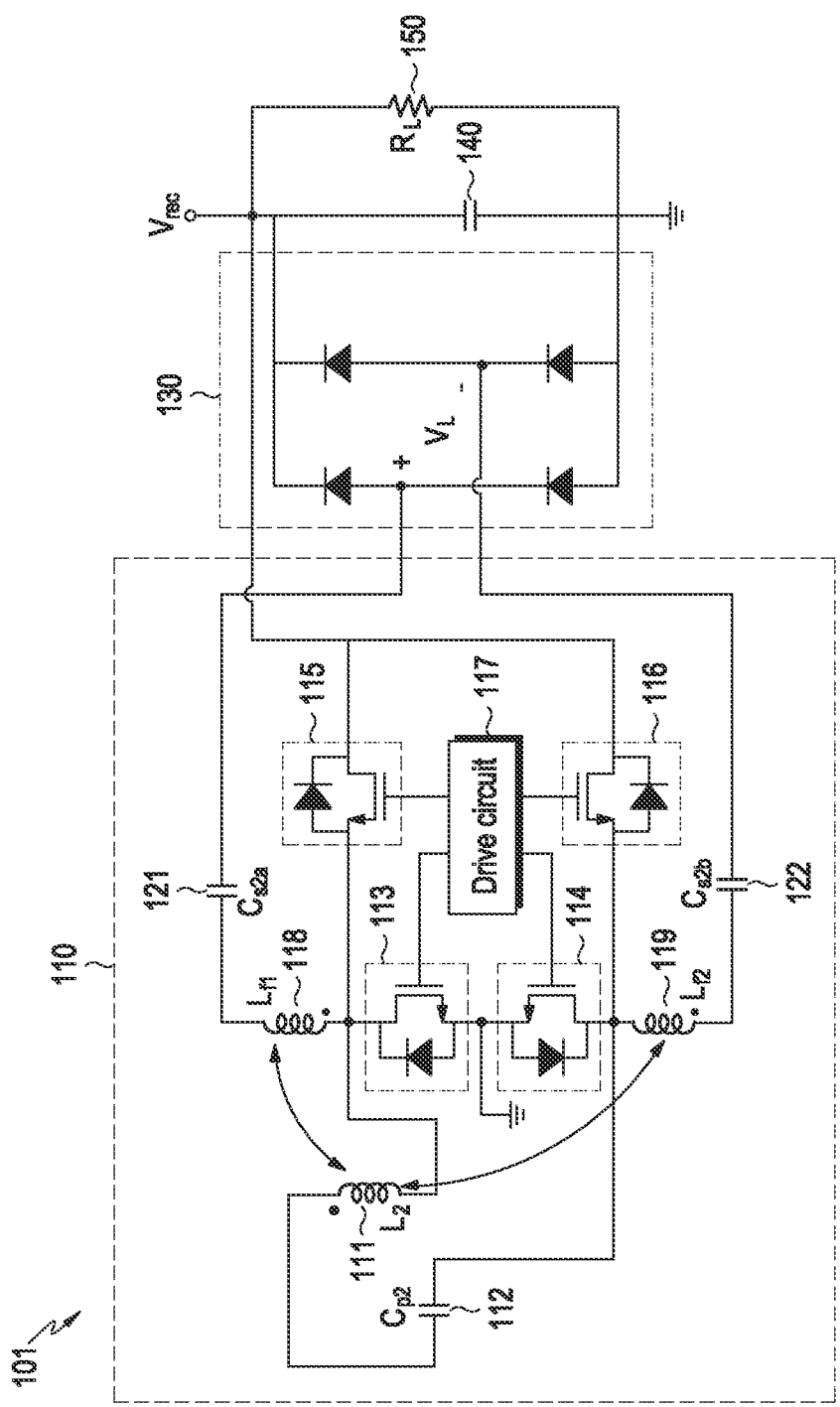
FIG. 1 is a circuit diagram illustrating a wireless power receiver for performing wireless charging according to a comparative example.
Figure 2A:
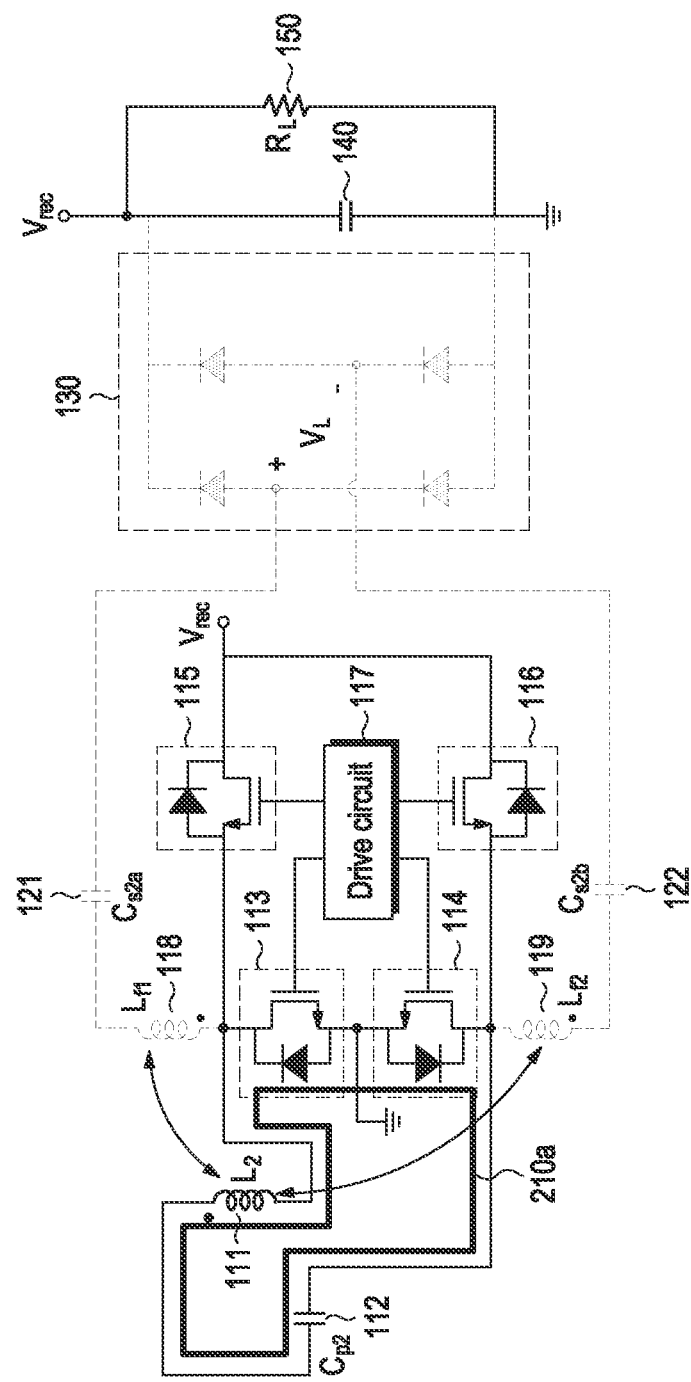
FIG. 2A is an equivalent circuit diagram illustrating the wireless power receiver according to the comparative example.
Figure 2B:
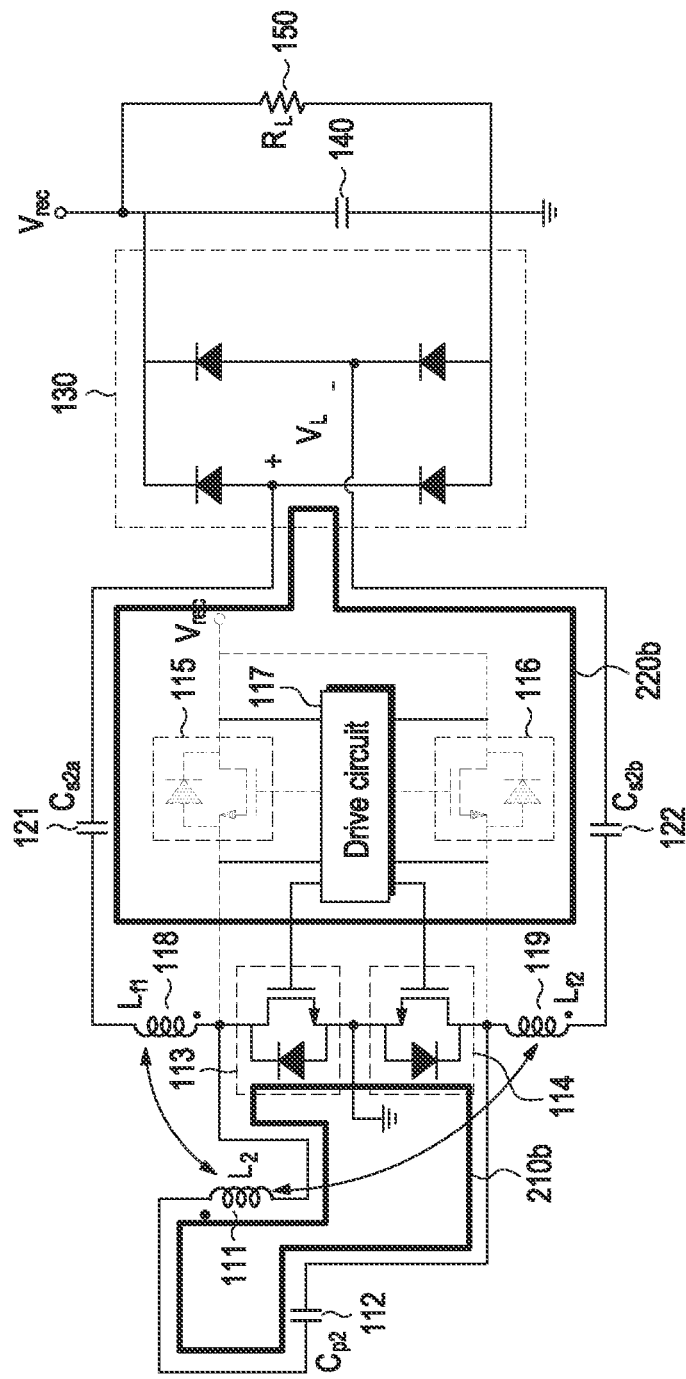
FIG. 2B is an equivalent circuit diagram illustrating the wireless power receiver according to the comparative example.
Figure 3:
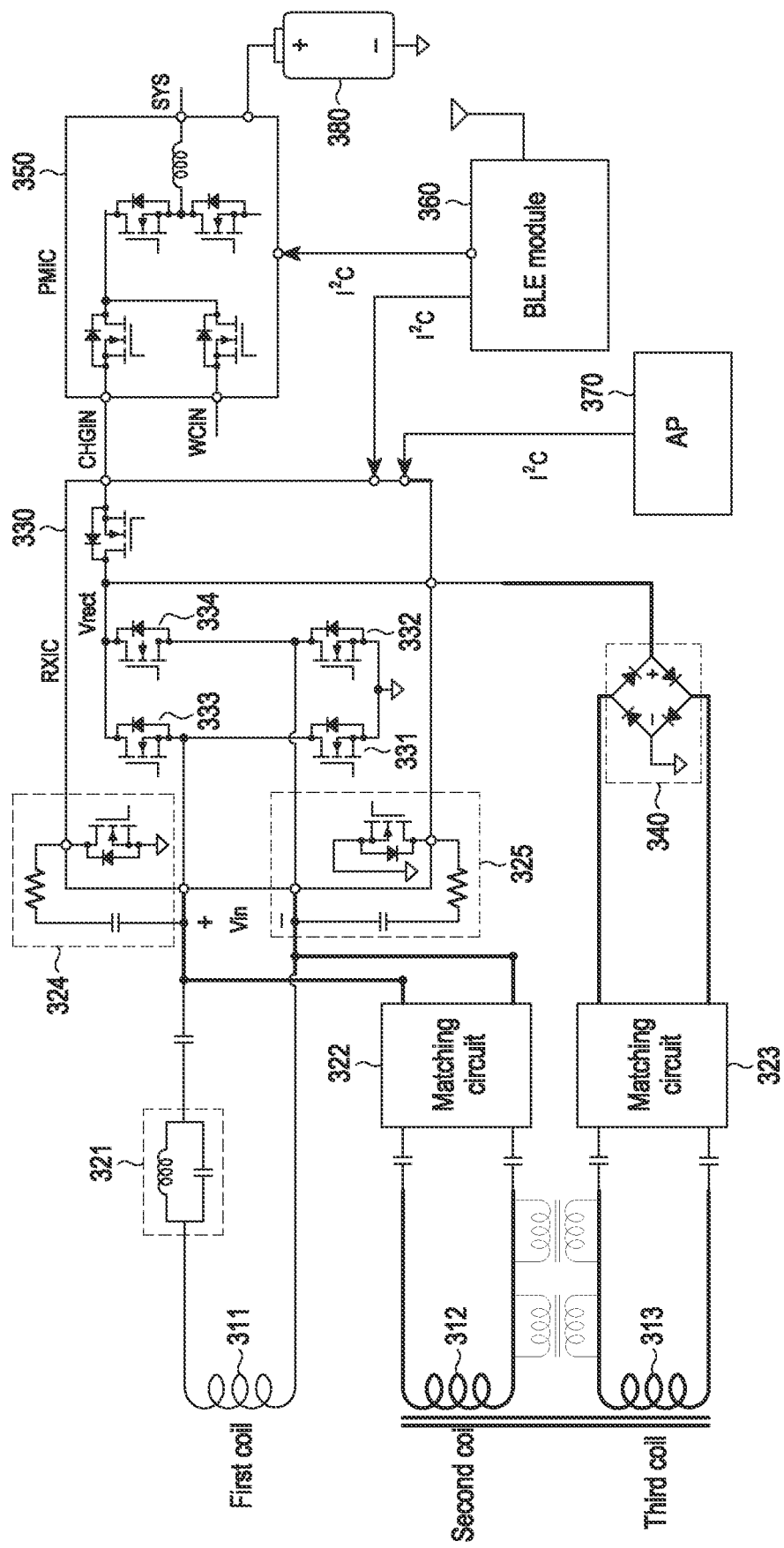
FIG. 3 is a circuit diagram illustrating an example wireless power receiver according to various embodiments.

FIG. 3 is a circuit diagram illustrating an example wireless power receiver according to various embodiments.

Referring to FIG. 3, the wireless power receiver may include a first coil 311, a second coil 312, a third coil 313, a bandstop filter 321, matching circuits 322 and 323, clamping circuits 324 and 325, a receiver integrated circuit (RXIC) 330, a second rectification circuit 340, a power management integrated circuit (PMIC) 350, a Bluetooth low energy (BLE) module (e.g., including BLE circuitry) 360, an application processor (AP) (e.g., including processing circuitry) 370, and a battery 380. The processor(s) and controller(s) described and as used herein, including the claims, the term "processor" may include various processing circuitry, including at least one processor, wherein one or more processors of the at least one processor may be configured to perform the various functions described herein.

According to various embodiments, the first coil 311 may be a coil for receiving wireless power transmitted in an inductive scheme. An induced voltage may be applied to the first coil 311 based on a change in a magnetic field generated by a transmission coil of a wireless power transmitter. The bandstop filter 321, which is a component for selecting a frequency component corresponding to inductive wireless charging from power induced in the first coil 311, may include at least one capacitor and at least one coil. According to various embodiments, the bandstop filter 321 may be configured to block a frequency component corresponding to resonant wireless charging, such as a 6.78 MHz component. The wireless power induced in the first coil 311 and passed through the bandstop filter 321 may be applied to an input terminal Vin of a first rectification circuit.

According to various embodiments, the second coil 312 and the third coil 313 may be coils for receiving wireless power transmitted in the resonant scheme. The second coil 312 may be connected to the matching circuit 322, and the third coil 313 may be connected to the matching circuit 323. Wireless power induced in the second coil 312 and passed through the matching circuit 322 may be applied to the input terminal Vin of the first rectification circuit.

The third coil 313 and the matching circuit 323 may be connected to the second rectification circuit 340. According to various embodiments, the second rectification circuit 340 may include four field effect transistors (FETs) or four diodes forming a full bridge structure. According to various embodiments, the second rectification circuit 340 may include two FETs or two diodes forming a half bridge structure. According to various embodiments, an output terminal of the second rectification circuit 340 may be connected to an output terminal Vrect of the first rectification circuit.

According to various embodiments, the RXIC 330 may include FETs included in the clamping circuits 324 and 325. According to various embodiments, the RXIC 330 may include a first FET 331, a second FET 332, a third FET 333, and a fourth FET 334 that form the first rectification circuit. Although the first FET 331, the second FET 332, the third FET 333, and the fourth FET 334 are shown as n-channel FETs in FIG. 3, at least one of the first FET 331, the second FET 332, the third FET 333, or the fourth FET 334 may be implemented as a p-channel FET according to various embodiments. The first FET 331, the second FET 332, the third FET 333, and the fourth FET 334 included in the first rectification circuit may form a full bridge structure. The sources of the first FET 331 and the second FET 332 may be connected to a ground.

Although not shown in FIG. 3, according to various embodiments, the RXIC 330 may include a gate driver, a microcontroller unit (MCU), memory, a low-dropout (LDO) regulator, a feedback control circuit, an overvoltage protection circuit, and a power block. According to various embodiments, the gate driver may switch the first FET 331, the second FET 332, the third FET 333, the fourth FET 334, and FETs included in the clamping circuits 324 and 325 to an on state or an off state by controlling gate voltages of the first FET 331, the second FET 332, the third FET 333, the fourth FET 334, and the FETs included in the clamping circuits 324 and 325. According to various embodiments, the MCU may control the gate driver. According to various embodiments, the memory may include at least one of flash/multi-time programmable (MTP) memory or static random access memory (SRAM).

According to various embodiments, the RXIC 330 may communicate with the AP 370 and the BLE module 360 in an inter integrated circuit (I²C) scheme.

According to various embodiments, the PMIC 350 may charge the battery 380 using wireless power which has been received through at least one of the first coil 311, the second coil 312, or the third coil 313 and converted to direct current (DC) power, or supply wireless power to charge another electronic device based on the power of the battery 380. According to various embodiments, the PMIC 350 may communicate with the BLE module 360 in the I²C scheme.

Although not shown in FIG. 3, according to various embodiments, the RXIC 330 may be connected to a magnetic secure transmission (MST) coil for performing MST communication, and control an operation of transmitting a signal from the MST coil. Further, although not shown in FIG. 3, the wireless power receiver may include a thermistor disposed near at least one of the first coil 311, the second coil 312, or the third coil 313 according to various embodiments. Additionally, although not shown in FIG. 3, the wireless power receiver may include a thermistor disposed near the RXIC 330 according to various embodiments.

Figure 4:
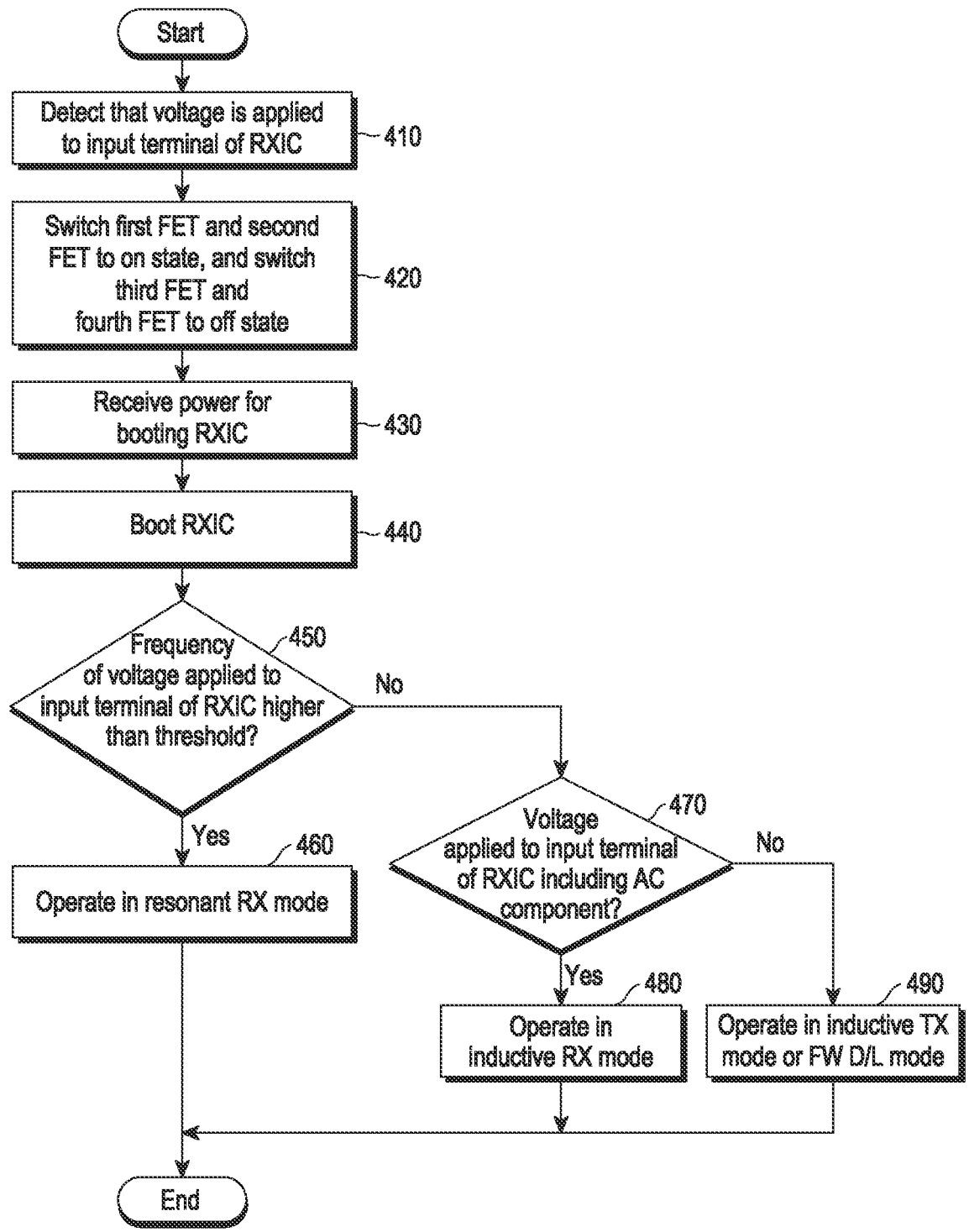
FIG. 4 is a flowchart illustrating example operations performed by a wireless power receiver according to various embodiments.

FIG. 4 is a flowchart illustrating example operations performed by a wireless power receiver according to various embodiments.

In operation 410, the RXIC 330 of the wireless power receiver may detect that a voltage is applied to the input terminal Vin of the RXIC 330. According to various embodiments, as a voltage is induced in at least one of the first coil 311 or the second coil 312 by a change in a magnetic field generated by a transmission coil of a wireless power transmitter, a voltage may be applied to the input terminal Vin of the RXIC 330. For example, in a case where the wireless power transmitter transmits wireless power in the resonant scheme, when the wireless power transmitter is in a power save state as defined in the Air Fuel Alliance (AFA) standard, it may transmit at least one beacon for detecting a wireless power receiver, and as the second coil 312 receives the at least one beacon, a voltage may be applied to the input terminal Vin of the RXIC 330. For example, in a case where the wireless power transmitter transmits wireless power in the inductive scheme, when the wireless power transmitter is in a ping state as defined in the Qi standard, it may transmit a ping signal, and as the first coil 311 receives the ping signal, a voltage may be applied to the input terminal Vin of the RXIC 330.

In operation 420, the RXIC 330 may switch the first FET 331 and the second FET 332 to the on state and switch the third FET 333 and the fourth FET 334 to the off state.

When the first FET 331 and the second FET 332 are switched to the on state and the third FET 333 and the fourth FET 334 are switched to the off state, the wireless power receiver may receive power for booting the RXIC 330 in operation 430. According to various embodiments, when the wireless power transmitter transmits wireless power in the inductive scheme, the wireless power receiver may receive wireless power through the first coil 311. In this case, the received wireless power may be converted to DC power by body diodes of the third FET 333 and the fourth FET 334. The converted DC power may be used to boot the RXIC 330. According to various embodiments, when the wireless power transmitter transmits wireless power in the resonant scheme, the wireless power receiver may receive wireless power through the second coil 312 and the third coil 313. As current is induced in the second coil 312 by a change in a magnetic field generated by the wireless power transmitter, and current is induced in the third coil 313 by a change in a magnetic field generated in the second coil 312, the wireless power receiver may receive wireless power. The received wireless power may be rectified by the second rectification circuit 340, and the rectified wireless power may be used to boot the RXIC 330. When the wireless power transmitter transmits wireless power in the resonant scheme, although an induced voltage may also be generated in the first coil 311, the induced voltage is blocked by the bandstop filter 321, which may be electrically equivalent to no connection between the input terminals of the first coil 311 and the RXIC 330.

The RXIC 330 may be booted in operation 440 based on the power received in operation 430. According to various embodiments, booting the RXIC 330 may refer, for example, to voltages at the output terminals Vrect of the first rectification circuit and the second rectification circuit 340 being equal to or higher than a minimum voltage required for the RXIC 330 to operate, and thus the RXIC 330 is driven. According to various embodiments, booting the RXIC 330 may refer, for example, to the wireless power receiver having entered a power-up state as defined in the AFA standard.

In operation 450, the RXIC 330 may identify the frequency of a voltage Vin applied to the input terminal of the RXIC 330. The RXIC 330 may identify whether the frequency of the voltage Vin applied to the input terminal of the RXIC 330 is greater than a threshold frequency. According to various embodiments, the threshold frequency may be set to a value less than a frequency used in resonant wireless power transmission and greater than a frequency used in inductive wireless power transmission. For example, the threshold frequency may be set to 1 MHz.

When the identified frequency is higher than the threshold frequency in operation 450, the RXIC 330 may operate in a resonant RX mode in operation 460. According to various embodiments, when it is said that the identified frequency is higher than the threshold frequency, this may refer, for example, to the wireless power transmitter attempting to transmit wireless power in the resonant scheme. As the RXIC 330 operates in the resonant RX mode, the wireless power receiver may also operate in the resonant RX mode. According to various embodiments, when it is said that the wireless power receiver operates in the resonant RX mode, this may refer, for example, to the wireless power receiver operating to receive wireless power in the resonant scheme. For example, the wireless power receiver may operate in the resonant RX mode as a power receiving unit (PRU) as defined in the AFA standard. The behavior of the wireless power receiver when operating in the resonant RX mode will be described in greater detail below with reference to FIG. 6.

When the identified frequency is not higher than the threshold frequency in operation 450, the RXIC 330 may identify whether the voltage Vin applied to the input terminal of the RXIC 330 includes an alternating current (AC) component in operation 470.

When identifying that the voltage Vin applied to the input terminal of the RXIC 330 includes an AC component in operation 470, the RXIC 330 may operate in an inductive RX mode in operation 480. According to various embodiments, when it is said that the frequency of the voltage Vin applied to the input terminal of the RXIC 330 includes an AC component less than the threshold frequency, this may refer, for example, to the wireless power transmitter attempting to transmit wireless power in the inductive scheme. As the RXIC 330 operates in the inductive RX mode, the wireless power receiver may also operate in the inductive RX mode. According to various embodiments, when it is said that the wireless power receiver operates in the inductive RX mode, this may refer, for example, to the wireless power receiver operating to receive wireless power in the inductive scheme. The behavior of the wireless power receiver when operating in the inductive RX mode will be described in greater detail below with reference to FIG. 7.

When identifying that the voltage Vin applied to the input terminal of the RXIC 330 does not include an AC component in operation 470, the RXIC 330 may operate in an inductive TX mode or an firmware download (FW D/L) mode in operation 490. According to various embodiments, when it is said that the wireless power receiver operates in the inductive TX mode, this may refer, for example, to the wireless power receiver operating to supply wireless power to another electronic device in the inductive scheme.

Figure 5:
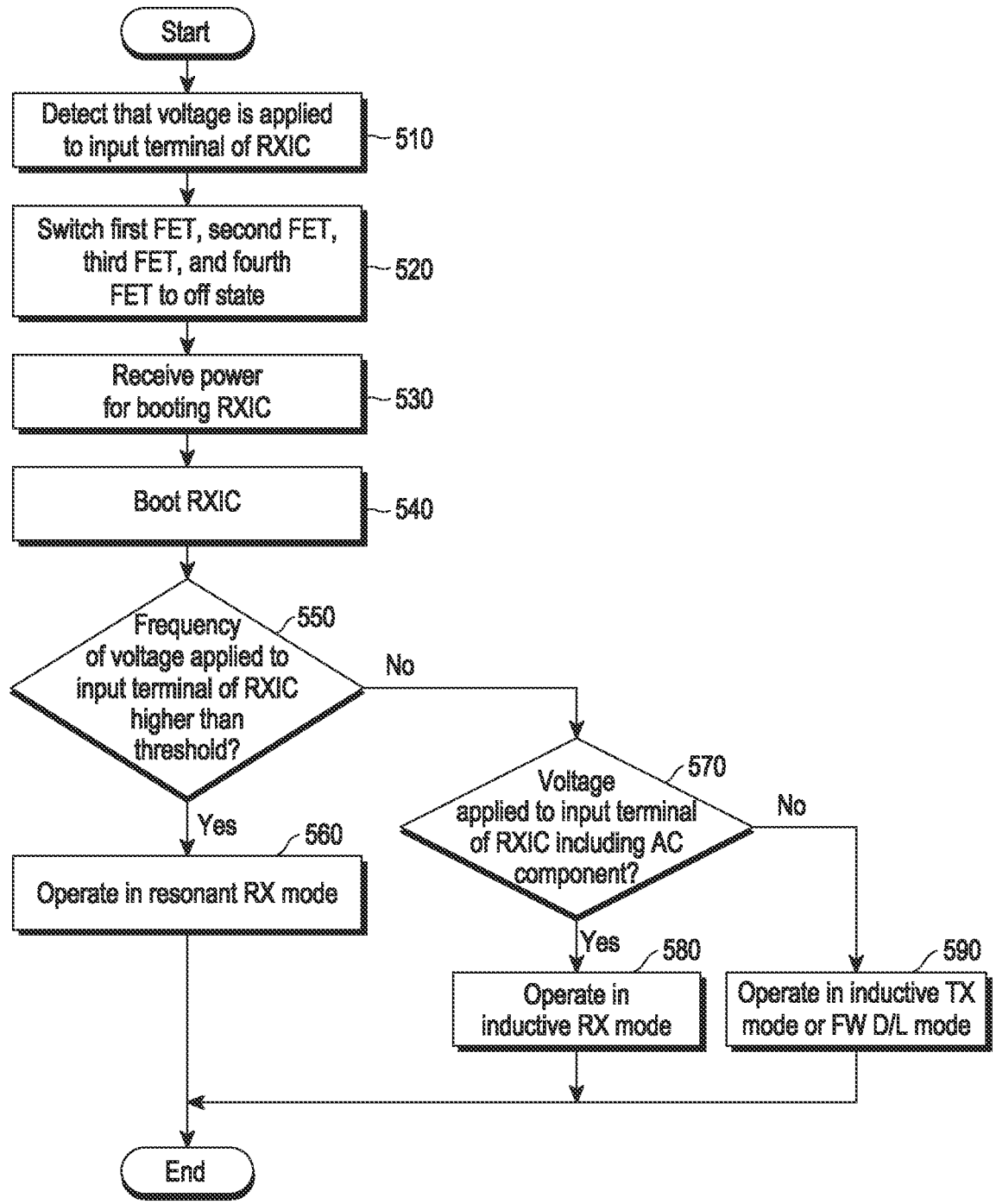
FIG. 5 is a flowchart illustrating example operations performed by a wireless power receiver according to various embodiments.

FIG. 5 is a flowchart illustrating example operations performed by a wireless power receiver according to various embodiments. As the details of operation 410, operation 440, operation 450, operation 460, operation 470, operation 480, and operation 490 in FIG. 4 are equally applicable to operation 510, operation 540, operation 560, operation 570, operation 580, and operation 590 in FIG. 5, respectively, a redundant description may not be repeated.

In operation 520, the RXIC 330 may switch the first FET 331, the second FET 332, the third FET 333, and the fourth FET 334 to the off state.

When the first FET 331, the second FET 332, the third FET 333, and the fourth FET 334 are switched to the off state, the wireless power receiver may receive power for booting the RXIC 330 in operation 530. According to various embodiments, when the wireless power transmitter transmits wireless power in the inductive scheme, the wireless power receiver may receive wireless power through the first coil 311. The received wireless power may be rectified by body diodes of the first FET 331, the second FET 332, the third FET 333, and the fourth FET 334, and the rectified wireless power may be used to boot the RXIC 330. According to various embodiments, when the wireless power transmitter transmits wireless power in the resonant scheme, the wireless power receiver may receive wireless power through the second coil 312. When the wireless power transmitter transmits wireless power in the resonant scheme, although an induced voltage may be generated in the first coil 311, the induced voltage is blocked by the bandstop filter 321, which is electrically equivalent to no connection between the input terminals of the first coil 311 and the RXIC 330. The wireless power received through the second coil 312 may be rectified by the body diodes of the first FET 331, the second FET 332, the third FET 333, and the fourth FET 334, and the rectified wireless power may be used to boot the RXIC 330.

As described above with reference to FIGS. 4 and 5, the wireless power receiver according to various embodiments may receive power for booting the RXIC 330 and boot the RXIC 330 in both a case where the wireless power transmitter transmits wireless power in the resonant scheme and a case where the wireless power transmitter transmits wireless power in the inductive scheme.

Figure 6:
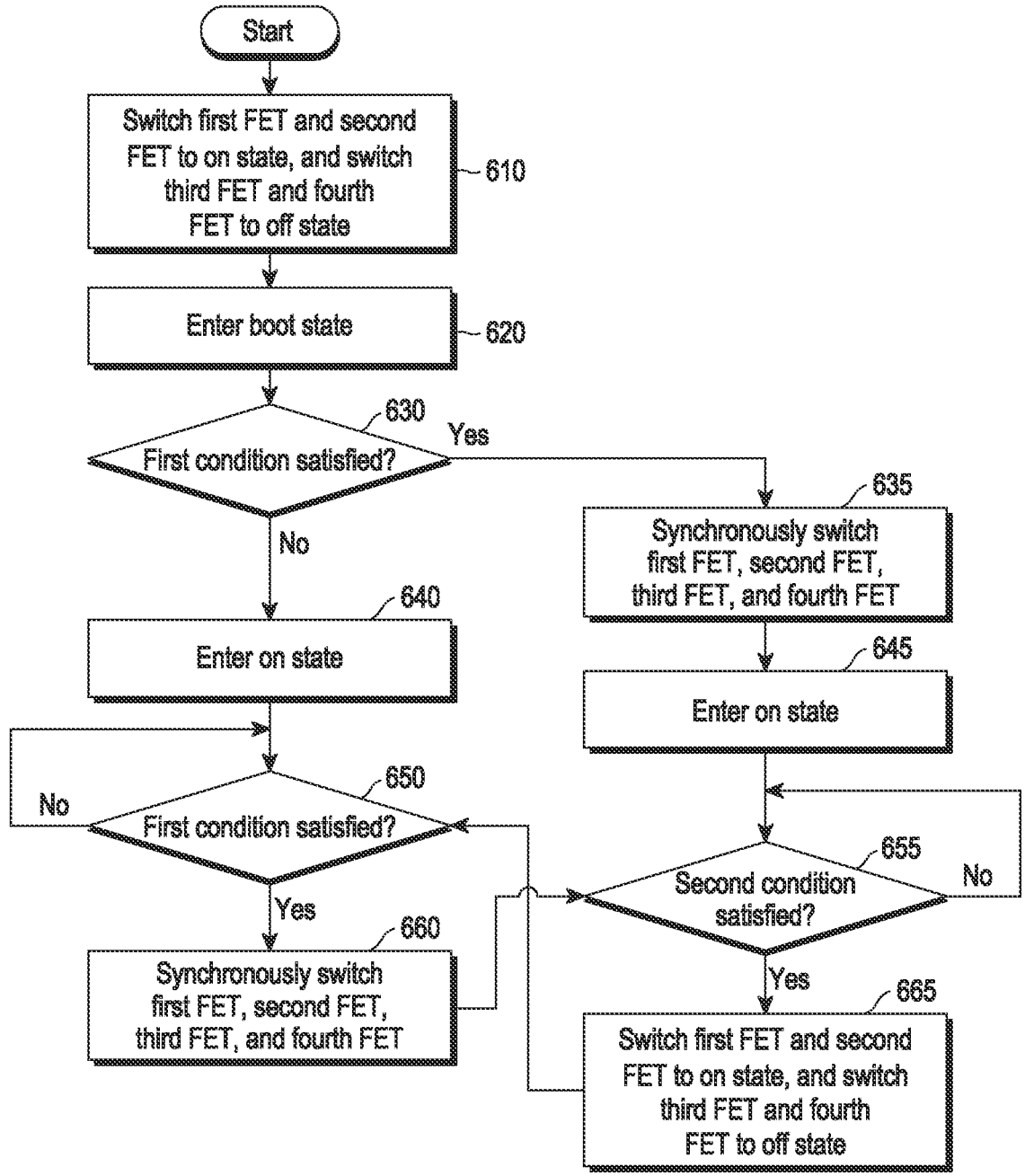
FIG. 6 is a flowchart illustrating example operations performed by a wireless power receiver in a resonant reception (RX) mode according to various embodiments.

FIG. 6 is a flowchart illustrating example operations performed by a wireless power receiver in a resonant RX mode according to various embodiments.

In operation 610, the booted RXIC 330 may switch the first FET 331 and the second FET 332 to be the on state, and switch the third FET 333 and the fourth FET 334 to the off state. In operation 620, the RXIC 330 may cause the wireless power receiver to enter a boot state. According to various embodiments, the boot state may be a boot state as defined in the AFA standard. According to various embodiments, the wireless power transmitter may be in a low power state as defined in the AFA standard. According to various embodiments, the wireless power receiver may transmit a wireless power transmitter discovery signal, which is a BLE-based advertisement signal for discovering the wireless power transmitter in the boot state, receive a PRU response signal from the wireless power transmitter, and transmit a PRU static signal indicating the state of the wireless power receiver to the wireless power transmitter, receive a PTU static signal indicating a capability of the wireless power transmitter from the wireless power transmitter, and periodically transmit a PRU dynamic signal including information about at least one parameter measured at the wireless power receiver to the wireless power transmitter. For example, the PRU dynamic signal may include information about the output voltages Vrect of the first rectification circuit and the second rectification circuit 340 in the wireless power receiver.

In operation 630, the RXIC 330 may identify whether a first condition is satisfied. According to various embodiments, the first condition may be satisfied, when the voltage of the wireless power received by the wireless power receiver is so high that the wireless power receiver may be damaged by receiving the wireless power by parallel resonance, and the wireless power receiver is required to receive the wireless power by series resonance. According to various embodiments, the first condition may be satisfied, when the output voltage Vrect of the first rectification circuit is higher than a first threshold voltage. For example, the first threshold voltage may be set to 12V. According to various embodiments, the RXIC 330 may identify the output voltage Vrect of the first rectification circuit a plurality of times, and identify that the first condition is satisfied when the average of the identified voltage values is greater than the first threshold voltage. According to various embodiments, the first condition may be satisfied, when a temperature of the wireless power receiver is higher than a threshold temperature. According to various embodiments, the temperature of the wireless power receiver may be identified using the thermistor disposed near the RXIC 330 or near at least one of the first coil 311, the second coil 312, or the third coil 313. According to various embodiments, the RXIC 330 may identify the temperature of the wireless power receiver a plurality of times, and identify that the first condition is satisfied when the average of the identified temperature values is greater than a first threshold temperature. According to various embodiments, the first condition may be a combination of the voltage condition and the temperature condition described above. For example, it may be configured that when at least one of the voltage condition or the temperature condition described above is satisfied, the first condition is satisfied. In another example, it may be configured that when both the voltage condition and the temperature condition described above are satisfied, the first condition is satisfied.

When identifying that the first condition is not satisfied in operation 630, the RXIC 330 may cause the wireless power receiver to enter the on state to receive wireless power in operation 640. Because the RXIC 330 causes the wireless power receiver to enter the on state while maintaining the switching state of operation 610, the first FET 331 and the second FET 332 may be switched to on state, and the third FET 333 and the fourth FET 334 may be switched to the off state in operation 640.

According to various embodiments, the on state may refer to an on state as defined in the AFA standard. In the on state, the wireless power receiver may receive a PRU control signal, which is a command signal instructing to perform charging, from the wireless power transmitter, receive charging power from the wireless power transmitter, change settings based on the PRU control signal, and transmit a PRU dynamic signal to the wireless power transmitter to report the state of the wireless power receiver. According to various embodiments, the PRU dynamic signal may include at least one of a voltage, current, a wireless power receiver state, or temperature information.

According to various embodiments, the wireless power transmitter may be in a power transfer state as defined in the AFA standard in operation 640.

In operation 650, the RXIC 330 may repeatedly identify whether the first condition is satisfied until identifying that the first condition indicating that the wireless power receiver is required to receive wireless power by series resonance is satisfied. During operation 650, the wireless power receiver may receive wireless power by parallel resonance. In other words, as current is induced in the second coil 312, and current is induced in the third coil 313 based on a magnetic field generated in the second coil 312, the wireless power receiver may receive wireless power, and the received wireless power may be rectified by the second rectification circuit 340.

When identifying that the first condition is satisfied in operation 650, the RXIC 330 may synchronously switch the first FET 331, the second FET 332, the third FET 333, and the fourth FET 334 in operation 660. According to various embodiments, synchronously switching the first FET 331, the second FET 332, the third FET 333, and the fourth FET 334 may refer, for example, to repeating switching of the first FET 331 and the fourth FET 334 to the on state and the second FET 332 and the third FET 333 to the off state and switching of the first FET 331 and the fourth FET 334 to the off state and the second FET 332 and the third FET 333 to the on state, depending on the sign of the voltage Vin input to the input terminal of the RXIC 330. In operation 660, the wireless power receiver may receive wireless power through the second coil 312, and the received wireless power may be rectified by the first FET 331, the second FET 332, the third FET 333, and the fourth FET 334 which are synchronously switched. In other words, the wireless power receiver may receive wireless power by series resonance in operation 660.

According to various embodiments, the wireless power receiver may be in the on state as defined in the AFA standard in operation 660. According to various embodiments, the wireless power transmitter may be in the power transfer state as defined in the AFA standard in operation 660.

The wireless power receiver performing operation 660 may identify whether a second condition is satisfied in operation 655. When the second condition is not satisfied, the wireless power receiver may continue to perform operation 660 while repeating operation 655. According to various embodiments, the second condition may indicate that the output voltage Vrect of the first rectification circuit is not sufficiently large and thus the wireless power receiver is required to receive wireless power by parallel resonance. According to various embodiments, the second condition may be satisfied, when the output voltage Vrect of the first rectification circuit is equal to or higher than a second threshold voltage. For example, the second threshold voltage may be set to 3V.

When identifying that the first condition is satisfied in operation 630, the RXIC 330 may synchronously switch the first FET 331, the second FET 332, the third FET 333, and the fourth FET 334 in operation 635.

In operation 645, the RXIC 330 may cause the wireless power receiver to enter the on state to receive wireless power. In operation 645, the wireless power receiver may receive wireless power through the second coil 312, and the received wireless power may be rectified by the first FET 331, the second FET 332, the third FET 333, and the fourth FET 334 which are synchronously switched. In other words, the wireless power receiver may receive wireless power by series resonance in operation 645.

According to various embodiments, the on state may refer to the on state as defined in the AFA standard. The on state has been described before in detail with reference to operation 640. According to various embodiments, the wireless power transmitter may be in the power transfer state as defined in the AFA standard in operation 645.

In operation 655, the RXIC 330 may repeatedly identify whether the second condition is satisfied until identifying that the second condition indicating that the wireless power receiver is required to receive wireless power by parallel resonance is satisfied. During operation 655, the wireless power receiver may continue to receive wireless power by series resonance as in operation 645.

When identifying that the second condition is satisfied in operation 655, the RXIC 330 may switch the first FET 331 and the second FET 332 to the on state and switch the third FET 333 and the fourth FET 334 to the off state in operation 665. In operation 665, the wireless power receiver may receive wireless power by parallel resonance. In other words, as current is induced in the second coil 312, and current is induced in the third coil 313 based on a magnetic field generated in the second coil 312, the wireless power receiver may receive wireless power, and the received wireless power may be rectified by the second rectification circuit 340. According to various embodiments, the wireless power transmitter may be in the on state as defined in the AFA standard in operation 665. According to various embodiments, the wireless power transmitter may be in the power transfer state as defined in the AFA standard in operation 665.

The wireless power receiver performing operation 665 may identify whether the first condition indicating that reception of wireless power by series resonance is required in operation 650. When the first condition is not satisfied, the wireless power receiver may continue to perform operation 650 while performing operation 665 repeatedly.

Figure 7:
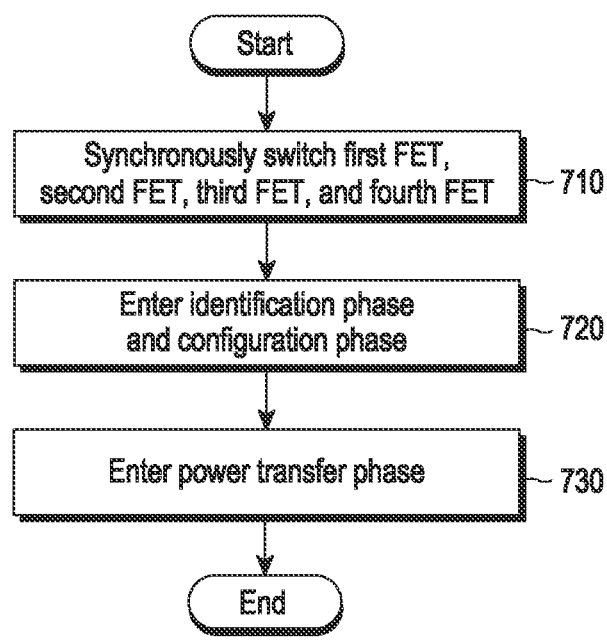
FIG. 7 is a flowchart illustrating example operations performed by a wireless power receiver in an inductive RX mode according to various embodiments.

FIG. 7 is a flowchart illustrating example operations performed by a wireless power receiver in an inductive RX mode according to various embodiments.

In operation 710, the booted RXIC 330 may synchronously switch the first FET 331, the second FET 332, the third FET 333, and the fourth FET 334. The synchronous switching of the first FET 331, the second FET 332, the third FET 333, and the fourth FET 334 has been described before with reference to operation 650 of FIG. 6.

In operation 720, the RXIC 330 may cause the wireless power receiver to enter an identification phase and a configuration phase. According to various embodiments, the identification phase and the configuration phase may be an identification phase & configuration phase as defined in the Qi standard.

In operation 730, the RXIC 330 may cause the wireless power receiver to enter the power transfer phase to receive wireless power from the wireless power transmitter. According to various embodiments, the power transfer phase may be the power transfer state as defined in the Qi standard.

Although not shown in FIG. 7, according to various embodiments, the RXIC 330 may perform at least one operation corresponding to a negotiation phase after performing operation 720 and before performing operation 730. The negotiation phase may be, for example, a phase as defined in the Qi standard. Further, although not shown in FIG. 7, the RXIC 330 may perform at least one operation corresponding to a calibration phase after performing operation 720 and before performing operation 730 according to various embodiments. The calibration phase may be, for example, a phase as defined in the Qi standard.

According to various example embodiments, a wireless power receiver for receiving wireless power from a wireless power transmitter may include: a first coil configured to receive wireless power transmitted in an inductive scheme, a second coil and a third coil configured to receive wireless power transmitted in a resonant scheme, a receiver integrated circuit (RXIC) including a first rectification circuit including a full bridge structure and including a first field effect transistor (FET), a second FET, a third FET, and a fourth FET, and a second rectification circuit, wherein an output terminal of the second rectification circuit is connected to an output terminal of the first rectification circuit. Sources of the first FET and the second FET may be connected to a ground. Based on the first FET and the second FET being switched to an on state, and the third FET and the fourth FET being switched to an off state: based on the wireless power transmitter transmitting the wireless power in the inductive scheme, the wireless power receiver may be configured to receive power for booting the RXIC by receiving the wireless power through the first coil and converting the received wireless power into DC power by body diodes of the third FET and the fourth FET, and based on the wireless power transmitter transmitting the wireless power in the resonant scheme, the wireless power receiver may be configured to receive the power for booting the RXIC by receiving the wireless power by induction of current in the third coil based on a magnetic field generated in the second coil and rectifying the received wireless power by the second rectification circuit.

According to various example embodiments, based on the first FET, the second FET, the third FET, and the fourth FET being switched to the off state: based on the wireless power transmitter transmitting the wireless power in the inductive scheme, the wireless power receiver may be configured to receive the power for booting the RXIC by receiving the wireless power through the first coil and rectifying the received wireless power by body diodes of the first FET, the second FET, the third FET, and the fourth FET, and based on the wireless power transmitter transmitting the wireless power in the resonant scheme, the wireless power receiver may be configured to receive the power for booting the RXIC by receiving the wireless power through the second coil and rectifying the received wireless power by the body diodes of the first FET, the second FET, the third FET, and the fourth FET.

According to various example embodiments, the RXIC may be configured to, based on being booted, identify a frequency of the wireless power, and operate in a mode identified based on the identified frequency.

According to various example embodiments, the RXIC may be configured to operate in a receiver (RX) mode in response to the identified frequency being greater than a threshold frequency.

According to various example embodiments, the RXIC may be configured to, based on operating in a resonant RX mode, switch the first FET and the second FET to the on state, switch the third FET and the fourth FET to the off state, cause the wireless power receiver to enter a boot state, identify whether a first condition is satisfied, and cause the wireless power receiver to enter the on state and receive the wireless power, in response to the first condition not being identified; or cause the wireless power receiver to enter the on state and receive the wireless power, while synchronously switching the first FET, the second FE, the third FET, and the fourth FET, in response to the first condition being satisfied.

According to various example embodiments, based on an output voltage of the first rectification circuit being greater than a first threshold voltage, or based on a temperature of the wireless power receiver being greater than a threshold temperature, the first condition may be satisfied.

According to various example embodiments, the wireless power receiver may be configured to receive the wireless power by receiving the wireless power by induction of the current in the third coil based on the magnetic field generated in the second coil and rectifying the received wireless power by the second rectification circuit, based on the first FET and the second FET being switched to the on state, the third FET and the fourth FET being switched to the off state, and the wireless power receiver being in the on state.

According to various example embodiments, the wireless power receiver may be configured to receive the wireless power through the second coil and rectify the received wireless power by the first rectification circuit, based on the first FET, the second FET, the third FET, and the fourth FET being switched synchronously, and the wireless power receiver being in the on state.

According to various example embodiments, the RXIC may be configured to identify whether the first condition is satisfied, while the first FET and the second FET are in the on state, the third FET and the fourth FET are in the off state, and the wireless power receiver receiving the wireless power in the on state, and switch the first FET, the second FET, the third FET, and the fourth FET synchronously in response to the first condition being satisfied.

According to various example embodiments, the RXIC may be configured to identify whether a second condition is satisfied during reception of the wireless power in the wireless power receiver in the on state, while synchronously switching the first FET, the second FET, the third FET, and the fourth FET, and switch the first FET and the second FET to the on state, and switch the third FET and the fourth FET to the off state, in response to the second condition being satisfied.

According to various example embodiments, based on an output voltage of the first rectification circuit being equal to or less than a second threshold voltage, the second condition may be satisfied.

According to various example embodiments, the RXIC may be configured to identify whether a voltage applied to an input terminal of the RXIC includes an AC component in response to the identified frequency being equal to or less than a threshold frequency, operate in an inductive RX mode in response to identifying that the voltage applied to the input terminal of the RXIC includes an AC component, and operate in an inductive TX mode or an FW D/L mode in response to identifying that the voltage applied to the input terminal of the RXIC does not include an AC component.

According to various example embodiments, the RXIC may be configured to, based on operating in the inductive RX mode, synchronously switch the first FET, the second FET, the third FET, and the fourth FET, enter an identification phase and a configuration phase, and enter a power transfer phase.

According to various example embodiments, the second rectification circuit may include four FETs or four diodes comprising a full bridge structure.

According to various example embodiments, the second rectification circuit may include two PhTs or two diodes comprising a half bridge structure.

According to various example embodiments, a method performed by a wireless power receiver for receiving wireless power from a wireless power transmitter may include: detecting that a voltage is applied to an input terminal of a receiver integrated circuit (RXIC) including a first rectification circuit comprising a full bridge structure and including the first field effect transistor (FET) 31, a second FET, a third FET, and a fourth FET, receiving the wireless power for booting the RXIC, and booting the RXIC. Receiving the wireless power for booting the RXIC may include, based on the first FET and the second FET being switched to an on state, and the third FET and the fourth FET being switched to an off state: based on the wireless power transmitter transmitting the wireless power in an inductive scheme, receiving the wireless power through the first coil receiving wireless power in the inductive scheme and converting the received wireless power into DC power by body diodes of the third FET and the fourth FET; or based on the wireless power transmitter transmitting the wireless power in a resonant scheme, receiving the wireless power by induction of current in the third coil based on a magnetic field generated in the second coil, and rectifying the received wireless power by the second rectification circuit.

According to various example embodiments, receiving the wireless power for booting the RXIC may include, based on the first FET, the second FET, the third FET, and the fourth FET being switched to the off state: based on the wireless power transmitter transmitting the wireless power in the inductive scheme, receiving the wireless power through the first coil and rectifying the received wireless power by body diodes of the first FET, the second FET, the third FET, and the fourth FET; or based on the wireless power transmitter transmitting the wireless power in the resonant scheme, receiving the wireless power through the second coil and rectifying the received wireless power by the body diodes of the first FET, the second FET, the third FET, and the fourth FET.

According to various example embodiments, the method may further include identifying a frequency of the wireless power, and operating in a mode identified based on the identified frequency.

According to various example embodiments, operating in the mode identified based on the identified frequency may include: operating in a resonant RX mode in response to the identified frequency being greater than a threshold frequency; identifying whether a voltage applied to an input terminal of the RXIC includes an AC component in response to the identified frequency being equal to or less than the threshold frequency; operating in an inductive RX mode in response to identifying that the voltage applied to the input terminal of the RXIC includes an AC component; and operating in an inductive TX mode or an FW D/L mode in response to identifying that the voltage applied to the input terminal of the RXIC does not include an AC component.

According to various example embodiments, operating in the resonant RX mode may include; switching the first FET and the second FET to the on state; switching the third FET and the fourth FET to the off state; causing the wireless power to enter a boot state; identifying whether an output voltage of the first rectification circuit is equal to or less than a first threshold voltage; entering the on state and receiving the wireless power in response to the output voltage of the first rectification circuit being greater than the first threshold voltage; and entering the on state and receiving the wireless power, while synchronously switching the first FET, the second FET, the third FET, and the fourth FET, in response to the output voltage of the first rectification circuit being equal to or less than the first threshold voltage.

The wireless power receiver according to various example embodiments of the disclosure may be one of various types of devices. The wireless power receiver may include, for example, a portable communication device (e.g., a smartphone), a computer device, a portable multimedia device, a portable medical device, a camera, a wearable device, a home appliance, or the like. According to an embodiment of the disclosure, the wireless power receiver is not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "$1^{st}$" and "$2^{nd}$", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, logic, logic block, part, or circuitry. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., the electronic device). For example, a processor (e.g., the processor) of the machine (e.g., the electronic device) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A wireless power receiver configured to receive wireless power from a wireless power transmitter, comprising:
   a first coil configured to receive wireless power transmitted in an inductive scheme,
   a second coil and a third coil configured to receive wireless power transmitted in a resonant scheme,
   a receiver integrated circuit (RXIC) including a first rectification circuit comprising a full bridge structure and including a first field effect transistor (FET), a second FET, a third FET, and a fourth FET, and
   a second rectification circuit, wherein an output terminal of the second rectification circuit is connected to an output terminal of the first rectification circuit,
   wherein sources of the first FET and the second FET are connected to a ground, and
   wherein based on the first FET and the second FET being switched to an on state, and the third FET and the fourth FET being switched to an off state:
   based on the wireless power transmitter transmitting the wireless power in the inductive scheme, the wireless power receiver is configured to receive power for booting the RXIC by receiving the wireless power through the first coil and convert the received wireless power into direct current (DC) power by body diodes of the third FET and the fourth FET, and
   based on the wireless power transmitter transmitting the wireless power in the resonant scheme, the wireless power receiver is configured to receive the power for booting the RXIC by receiving the wireless power by induction of current in the third coil based on a magnetic field generated in the second coil and rectify the received wireless power by the second rectification circuit.

2. The wireless power receiver of claim 1, wherein based on the first FET, the second FET, the third FET, and the fourth FET being switched to the off state:
   based on the wireless power transmitter transmitting the wireless power in the inductive scheme, the wireless power receiver is configured to receive the power for booting the RXIC by receiving the wireless power through the first coil and rectifying the received wireless power by body diodes of the first FET, the second FET, the third FET, and the fourth FET, and
   based on the wireless power transmitter transmitting the wireless power in the resonant scheme, the wireless power receiver is configured to receive the power for booting the RXIC by receiving the wireless power through the second coil and rectify the received wireless power by the body diodes of the first FET, the second FET, the third FET, and the fourth FET.

3. The wireless power receiver of claim 1, wherein the RXIC is configured to, based on being booted:
    identify a frequency of the wireless power, and
    operate in a mode identified based on the identified frequency.

4. The wireless power receiver of claim 3, wherein the RXIC is configured to operate in a resonant reception (RX) mode in response to the identified frequency being greater than a threshold frequency.

5. The wireless power receiver of claim 4, wherein the RXIC is configured to, based on operating in a resonant RX mode: switch the first FET and the second FET to the on state, switch the third FET and the fourth FET to the off state, cause the wireless power receiver to enter a boot state, identify whether a first condition is satisfied, and cause the wireless power receiver to enter the on state and receive the wireless power, in response to the first condition not being identified; or cause the wireless power receiver to enter the on state and receive the wireless power, while synchronously switching the first FET, the second FE, the third FET, and the fourth FET, in response to the first condition being satisfied.

6. The wireless power receiver of claim 5, wherein based on an output voltage of the first rectification circuit being greater than a first threshold voltage, or based on a temperature of the wireless power receiver being greater than a threshold temperature, the first condition is satisfied.

7. The wireless power receiver of claim 5, wherein the wireless power receiver is configured to receive the wireless power by receiving the wireless power by induction of the current in the third coil based on the magnetic field generated in the second coil and rectifying the received wireless power by the second rectification circuit, based on the first FET and the second FET being switched to the on state, the third FET and the fourth FET being switched to the off state, and the wireless power receiver being in the on state.

8. The wireless power receiver of claim 5, wherein the wireless power receiver is configured to receive the wireless power through the second coil and rectify the received wireless power by the first rectification circuit, based on the first FET, the second FET, the third FET, and the fourth FET being switched synchronously, and the wireless power receiver being in the on state.

9. The wireless power receiver of claim 5, wherein the RXIC is configured to:
    identify whether the first condition is satisfied, while the first FET and the second FET are in the on state, the third FET and the fourth FET are in the off state, and the wireless power receiver receives the wireless power in the on state, and
    switch the first FET, the second FET, the third FET, and the fourth FET synchronously in response to the first condition being satisfied.

10. The wireless power receiver of claim 5, wherein the RXIC is configured to:
    identify whether a second condition is satisfied during reception of the wireless power in the wireless power in the on state, while synchronously switching the first FET, the second FET, the third FET, and the fourth FET, and
    switch the first FET and the second FET to the on state, and switch the third FET and the fourth FET to the off state, in response to the second condition being satisfied.

11. The wireless power receiver of claim 10, wherein based on an output voltage of the first rectification circuit being equal to or less than a second threshold voltage, the second condition is satisfied.

12. The wireless power receiver of claim 3, wherein the RXIC is configured to:
    identify whether a voltage applied to an input terminal of the RXIC includes an alternating current (AC) component in response to the identified frequency being equal to or less than a threshold frequency,
    operate in an inductive RX mode in response to identifying that the voltage applied to the input terminal of the RXIC includes an AC component, and
    operate in an inductive transmission (TX) mode or an firmware download (FW D/L) mode in response to identifying that the voltage applied to the input terminal of the RXIC does not include an AC component.

13. The wireless power receiver of claim 12, wherein the RXIC is configured to, based on operating in the inductive RX mode:
    synchronously switch the first FET, the second FET, the third FET, and the fourth FET,
    enter an identification phase and a configuration phase, and
    enter a power transfer phase.

14. The wireless power receiver of claim 1, wherein the second rectification circuit includes four FETs or four diodes comprising a full bridge structure.

15. The wireless power receiver of claim 1, wherein the second rectification circuit includes two FETs or two diodes comprising a half bridge structure.

16. The method performed by a wireless power receiver configured to receive wireless power from a wireless power transmitter, the method comprising:
    detecting that a voltage is applied to an input terminal of a receiver integrated circuit (RXIC) including a first rectification circuit comprising a full bridge structure and including the first field effect transistor (FET) 31, a second FET, a third FET, and a fourth FET,
    receiving the wireless power for booting the RXIC, and booting the RXIC, and
    wherein receiving the wireless power for booting the RXIC include, based on the first FET and the second FET being switched to an on state, and the third FET and the fourth FET being switched to an off state:
    based on the wireless power transmitter transmitting the wireless power in an inductive scheme, receiving the wireless power through a first coil configured to receive wireless power in the inductive scheme and converting the received wireless power into DC power by body diodes of the third FET and the fourth FET; or
    based on the wireless power transmitter transmitting the wireless power in a resonant scheme, receiving, based on a magnetic field generated in a second coil configured to receive wireless power transmitted in the resonant scheme, the wireless power by induction of current in a third coil configured to receive wireless power transmitted in the resonant scheme, and rectifying the received wireless power by the second rectification circuit.

17. The method of claim 16, wherein receiving the wireless power for booting the RXIC includes, based on the first FET, the second FET, the third FET, and the fourth FET being switched to the off state:
    based on the wireless power transmitter transmitting the wireless power in the inductive scheme, receiving the wireless power through the first coil and rectifying the received wireless power by body diodes of the first FET, the second FET, the third FET, and the fourth FET; or based on the wireless power transmitter transmitting the wireless power in the resonant scheme, receiving the wireless power through the second coil and rectifying the received wireless power by the body diodes of the first FET, the second FET, the third FET, and the fourth FET.

18. The method of claim 16, further comprising:
identifying a frequency of the wireless power; and
operating in a mode identified based on the identified frequency.

19. The method of claim 18, wherein operating in the mode identified based on the identified frequency includes:
operating in a resonant RX mode in response to the identified frequency being greater than a threshold frequency;
identifying whether a voltage applied to an input terminal of the RXIC includes an AC component in response to the identified frequency being equal to or less than the threshold frequency;
operating in an inductive RX mode in response to identifying that the voltage applied to the input terminal of the RXIC includes an AC component; and
operating in an inductive TX mode or an firmware download (FW D/L) mode in response to identifying that the voltage applied to the input terminal of the RXIC does not include an AC component.

20. The method of claim 19, wherein operating in the resonant RX mode includes:
switching the first FET and the second FET to the on state;
switching the third FET and the fourth FET to the off state;
causing the wireless power to enter a boot state;
identifying whether an output voltage of the first rectification circuit is equal to or less than a first threshold voltage;
entering the on state and receiving the wireless power in response to the output voltage of the first rectification circuit being greater than the first threshold voltage; and
entering the on state and receiving the wireless power, while synchronously switching the first FET, the second FET, the third FET, and the fourth FET, in response to the output voltage of the first rectification circuit being equal to or less than the first threshold voltage.

* * * * *